(No Model.)
D. SINGLETARY.
HORSE DETACHER.
No. 338,308. Patented Mar. 23, 1886.
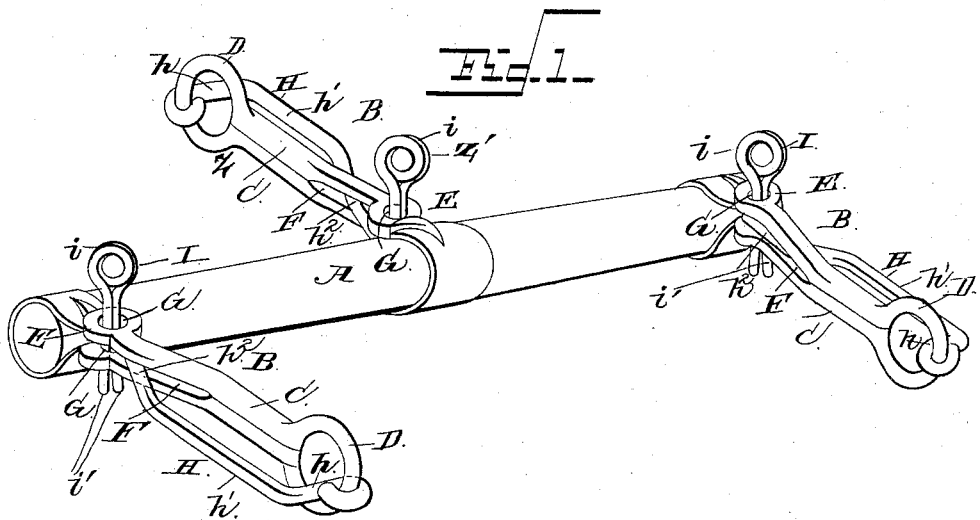
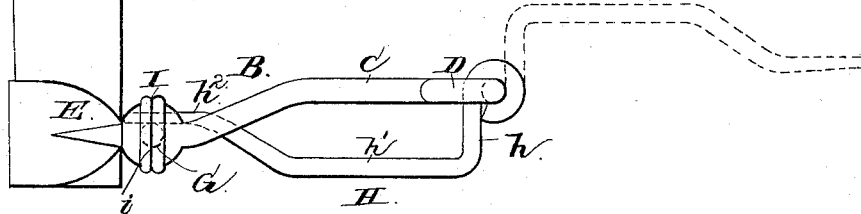
Witnesses
M. E. Fowler
J. W. Garner
Inventor
D. Singletary
By his Attorneys

UNITED STATES PATENT OFFICE.

DON SINGLETARY, OF UNION CITY, TENNESSEE.

HORSE-DETACHER.

SPECIFICATION forming part of Letters Patent No. 338,308, dated March 23, 1886.

Application filed December 18, 1885. Serial No. 186,073. (No model.)

*To all whom it may concern:*

Be it known that I, DON SINGLETARY, a citizen of the United States, residing at Union City, in the county of Obion and State of Tennessee, have invented a new and useful Improvement in Horse-Detachers, of which the following is a specification, reference being had to the accompanying drawings.

My invention relates to an improvement in horse-detachers; and it consists in the peculiar construction and combination of devices that will be more fully set forth hereinafter, and particularly pointed out in the claims.

The object of my invention is to provide an apparatus by means of which a horse may be readily attached to and detached from the whiffletree, and by means of which the whiffletree may be readily attached to and detached from the double-tree without the use of a lap ring.

In the drawings, Figure 1 is a perspective view of a whiffletree provided with my improved detacher. Fig. 2 is a detailed view of the detacher closed in solid lines and open in dotted lines.

A represents a whiffletree, to the ends of which are attached my detachers B. Each of the detachers has an arm, C, provided with an eye, D, at its outer end, and a clip, E, at its inner end to attach it to the end of the whiffletree. An opening, F, or slot is made in the inner end of the arm, and through the arm adjacent to the clip are made vertical aligned openings G.

H represents a hook, which is bent in the form shown, having the transverse portion $h$, the longitudinal portion $h'$, and the bent end $h^2$. The transverse portion has its terminal end attached or hinged to the eye of the arm C, and the bent end $h^2$ engages the opening F.

In order to attach the horse to the whiffletree, the hooks H are first swung downwardly or outwardly, as shown in dotted lines in Fig. 2, and the ends of the chains or traces passed on the hooks, when the latter are closed and keys I passed through the openings G, which bear against the bent ends of the hooks and prevent them from being opened, as shown in solid lines in Fig. 2. The keys I are made of spring-wire, bent to form the coil $i$, having the extended arms $i'$. The resilience of the coil keeps these arms normally diverged. In order to pass these arms through the openings G, they are first pressed together between the thumb and forefinger, and when they are passed through the said openings to lock the hooks the ends of the arms $i'$ spring apart and prevent the key from working loose. The draft on the traces or chains bears against the transverse ends $h^2$ of the hooks, and owing to the length of the latter and their peculiar form the keys have great leverage, and but very little strain is on them.

In order to detach the horse, it is only necessary to withdraw the keys, when the hooks fly open and the traces or chains slip off, as will be very readily understood.

In Fig. 1 I illustrate a third detacher, Z, which is similar to the detacher B, and is attached to the center of a whiffletree and extends rearwardly therefrom. This detacher serves to attach the whiffletree to a doubletree or plow, &c., without the use of a lapring. By withdrawing the key Z' of the detacher Z the whiffletree becomes detached from the double-tree or plow, &c., instantly.

Having thus described my invention, I claim—

1. The detacher comprising the arm, the hook pivoted or hinged thereto, and to which the trace or chain is attached, and the key for securing the hook when the latter is closed against the arm, substantially as described.

2. The detacher comprising the arm C, provided with the eye D, the clip E, the slotted opening F, and the aligned openings G, the hook pivoted or hinged to the eye D and having the transverse bent end $h$, against which the trace or chain draws, the longitudinal portion $h'$, and the bent end $h^2$, to enter the slotted opening F when the hook is closed, and the key passed through the openings G to lock the hook in a closed position, substantially as described.

3. The combination, with the detacher having the hinged or pivoted hook, of the key formed of spring wire and having the normally-diverging arms, substantially as described.

In testimony that I claim the foregoing as my own I have hereto affixed my signature in presence of two witnesses.

DON SINGLETARY.

Witnesses:
E. G. SIGGERS,
PERCY C. BOWEN.